June 14, 1927. 1,632,597
T. F. HALL
BERRY HARVESTER
Filed Dec. 2, 1925 6 Sheets-Sheet 3
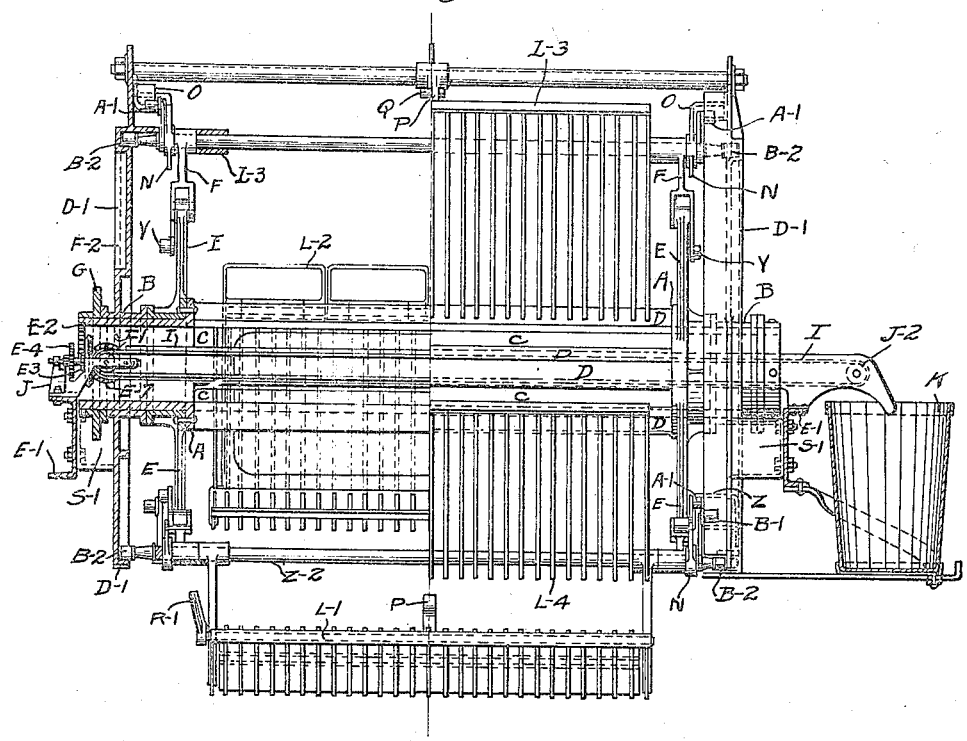
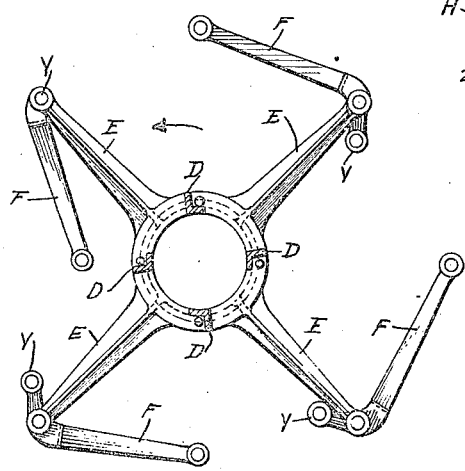
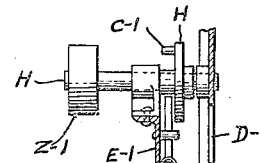
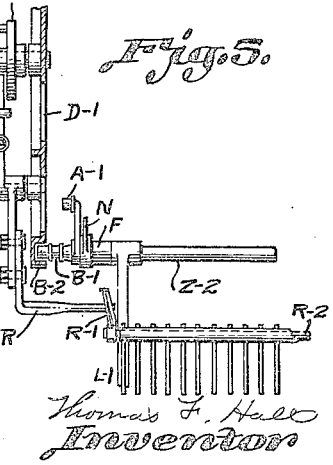
Thomas F. Hall
Inventor

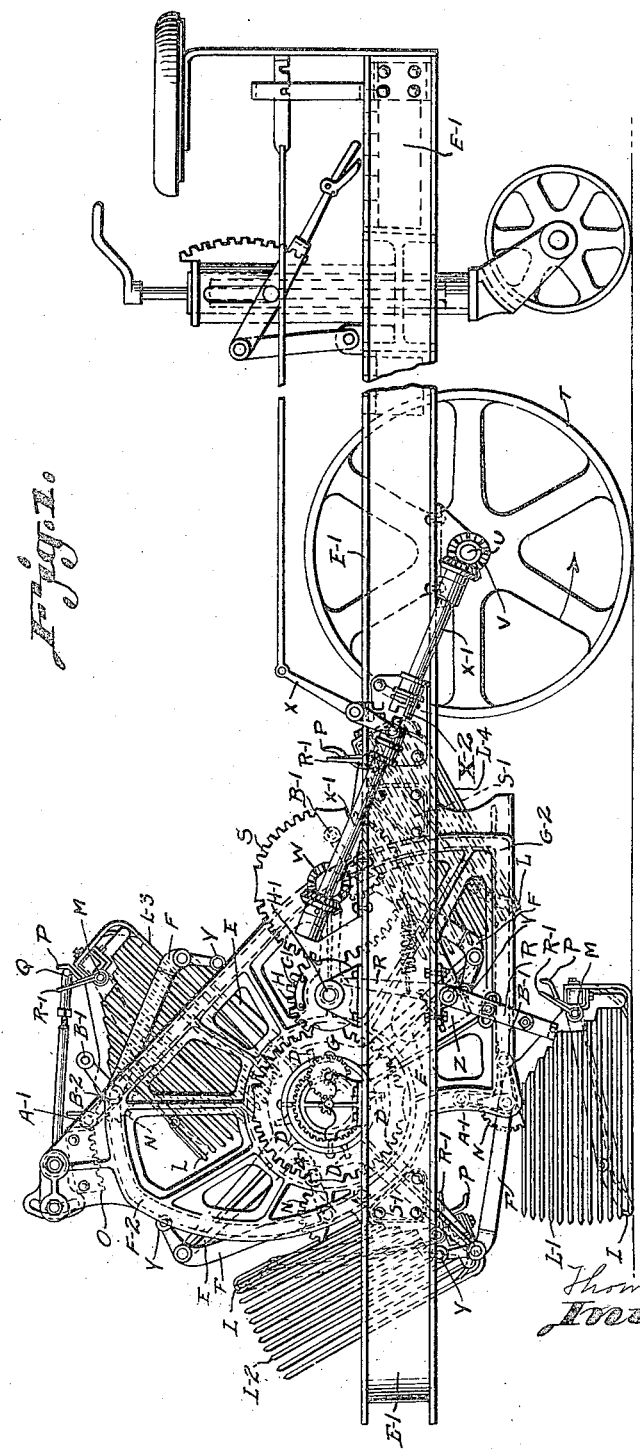

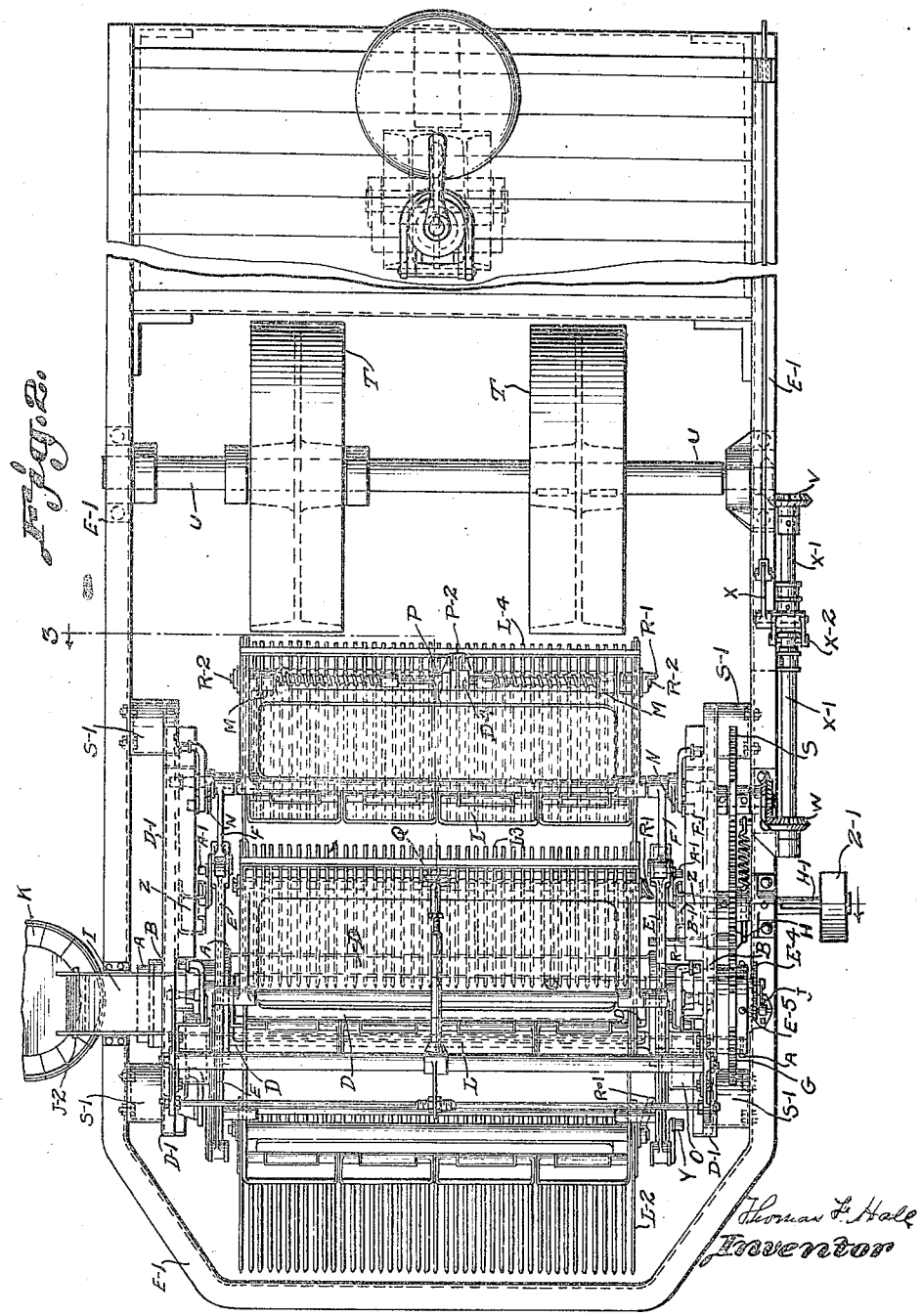

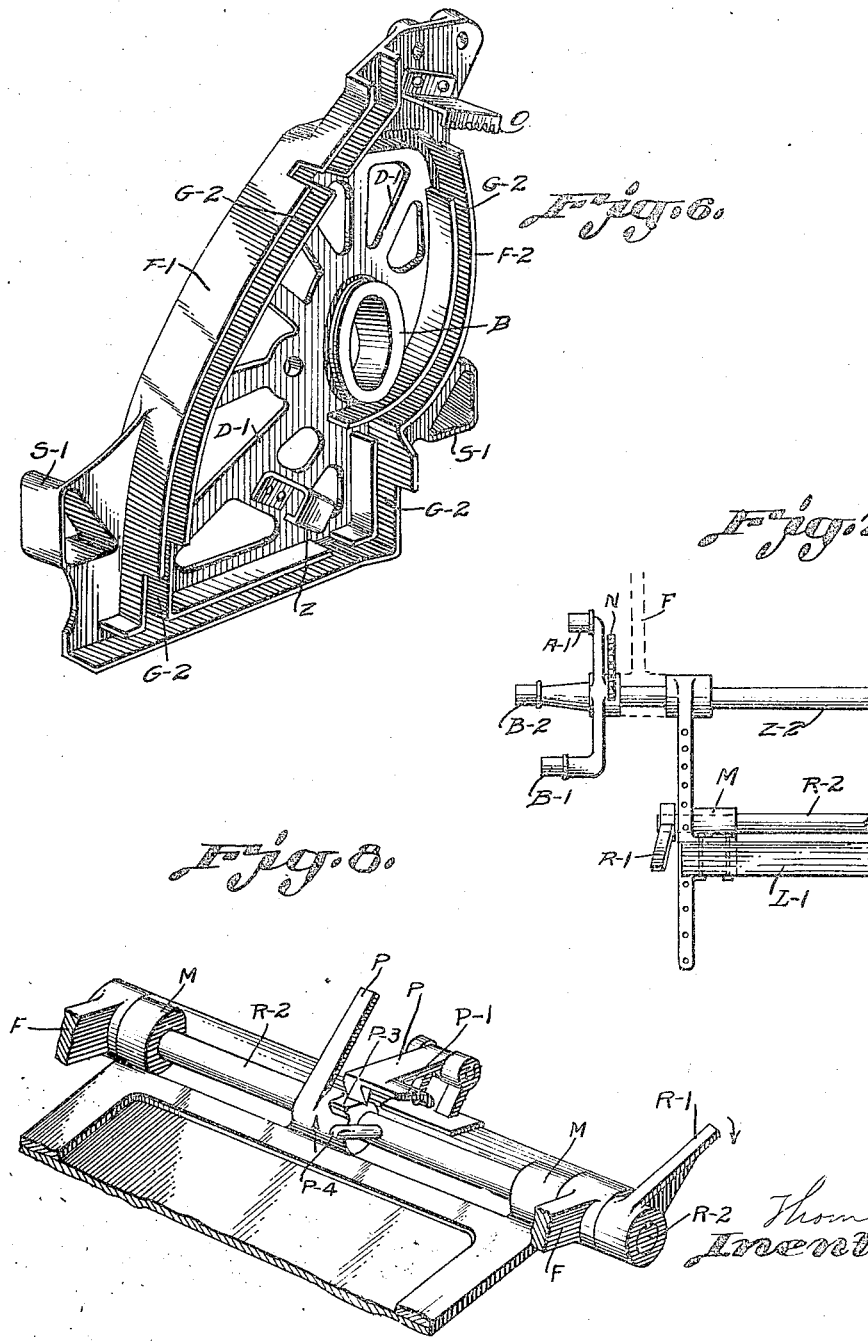

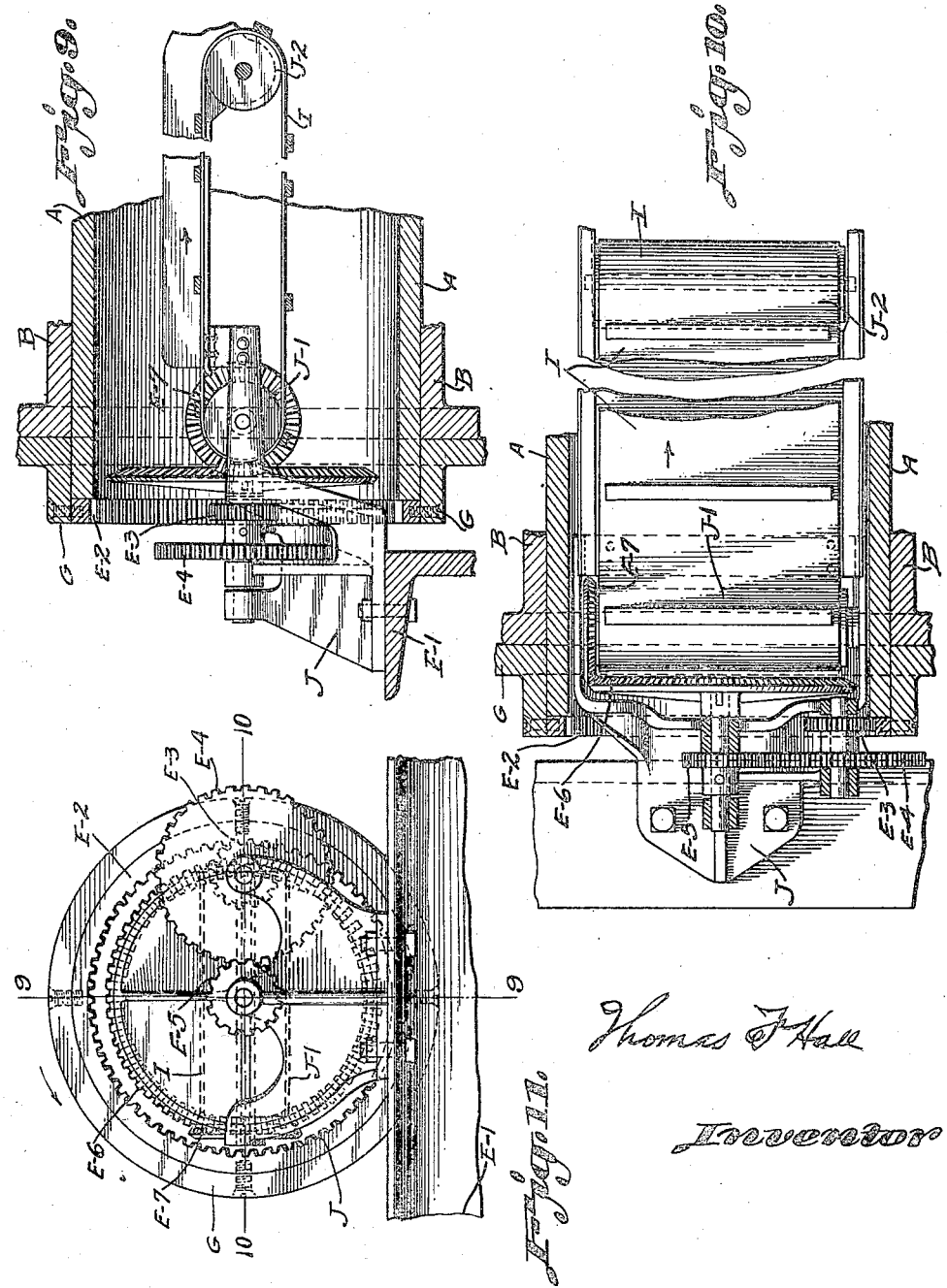

Patented June 14, 1927.

1,632,597

UNITED STATES PATENT OFFICE.

THOMAS F. HALL, OF OMAHA, NEBRASKA.

BERRY HARVESTER.

Application filed December 2, 1925. Serial No. 72,827.

Cultivated cranberries grow on upright vines planted on level ground. The vines annually send out horizontally, wire-like runners near the ground. From these branch runners other upright vines grow and bear berries. The growing berries hang upon these upright vines from the surface of the ground to the top of the vines to a maximum distance approximating nine inches. The annual sending out of runners creates a tangled mess of vines resting on the ground from which tangle it is difficult to salvage berries that may have fallen into it.

My invention consists of a mechanism for harvesting all these berries, without injuring them or the vines.

Figure 1 is a side view of my invention.

Figure 2 is a plan view.

Figure 3 is an elevation—through line 3—3 looking forward in direction shown by arrows on Figure 2.

Figure 4 is a detail view of the arms at both ends of and integral with the revolvable cylindrical tube.

Figure 5 is a sectional view of parts adapted to close lid of picker after it has been lowered to the ground and has been advanced into vines and is about to be withdrawn from vines by subsequent intermittent rotation of cylindrical tube.

Figure 6 is a perspective view of the left cam carrying main side wall.

Figure 7 is a detail view of one end of each of the four axles, each axle supporting a picker and carried by the arms "F" shown in detail view Figure 4, with a set of guide cam rollers $A^1$, $B^1$, $B^2$ and a segmental gear "N" on either end to control position of picker in its course around intermittently rotating cylindrical tube.

Figure 8 is a perspective part view of picker lid at pivoted end showing in detail the latch and related parts adapted to open lid, hold it open and release it for closing after picker has again reached the ground.

Figure 9 is a vertical sectional view through line 9—9 on Figure 11, showing arrangement of belt drive mechanism.

Figure 10 is a horizontal sectional view through line 10—10 on Figure 11, showing arrangement of same, belt drive mechanism.

Figure 11 is an end elevation of belt drive mechanism shown sectionally in Figures 9 and 10.

Figure 12:
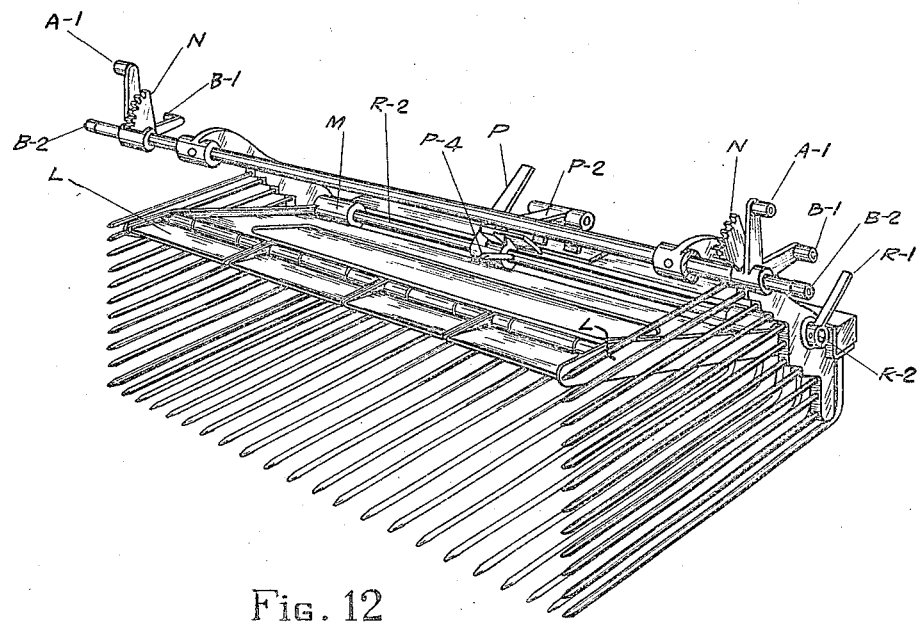
Figure 12 is a front perspective view of one of the four pickers "L", showing lid of picker held open by the holding latch $P^2$ and ready for advancement into the vines.

Description.

A is a revolvable, hollow, cylindrical tube supported by bearings B at each end, shown best in Figures 3 and 6. C, C, C, C, are four open ports through the wall of said tube "A", shown best in Figures 3 and 4.

D, D, D, D, are four strips of said wall remaining between said ports C, C, C, C, and parallel to, and of equal length to said ports. Said ports and strips of wall are situated between said bearing surfaces of said tube "A" and between the bearings "B".

E, E, E, E, are four arms attached to said tube at each end and pivotally connected by the links F, F, F, F, to the pickers $L^1$, $L^2$, $L^3$, and $L^4$.

H is a drive gear continuously rotating in direction shown by arrow on Figure 1. It is driven by pulley $Z^1$, mounted on outer end of gear shaft $H^1$, to which the power is applied by means of a belt and any appropriate motive power, not shown.

I is a berry conveyor belt suspended within said tube "A" by the drive roller $J^1$, and driven roller $J^2$. Said drive roller $J^1$ is supported in belt drive bracket "J" which is bolted to channel iron side frame $E^1$. Belt "I" is driven by means of internal gear $E^2$ at end of tube "A", which drives pinion $E^3$ and spur gear $E^4$. This spur gear $E^4$ drives pinion $E^5$, on the same shaft with bevel gear $E^6$, which drives bevel gear $E^7$ on belt drive roller $J^1$.

L, L, L, L, are the upper jaws acting as lids in the pickers $L^1$, $L^2$, $L^3$, $L^4$ and pivoted to said pickers at the points M, M, M, M, shown plainly in Figure 8. The lids (Fig. 1) are shown open in pickers $L^2$ and $L^3$, and shown closed in pickers $L^1$ and $L^4$.

N, N, N, N, are segmental gears, each integrally mounted on the axle $Z^2$, supporting the picker, at right angles thereto, (see Fig. 7) and adapted to mesh with a corresponding stationary rack "O" at upper part of main side walls $D^1$ in location shown in Fig. 6, for purposes of rotating each picker in turn, to position required for re-engagement of cam guide rollers, in cam guide, after picker has emptied its berries onto belt I.

P is an arm attached to the pivoted end of lid L (see Fig. 8) for opening the lids of pickers $L^1$, $L^2$, $L^3$, $L^4$, when arm "P", which is rigidly attached to picker lid, comes in contact with the stationary stop "Q". See Figs. 1, 2 and 3. Said stop "Q" is carried on cross tie members at upper center of the harvester. Lid "L" rotatably supported on shaft R², is held open by tooth P³ on arm "P", engaging a tooth on holding pawl P², which is rigidly fulcrumed on cross frame between the links "F", shown detailed in Fig. 4, until shaft R², (having projecting release pin P⁴) is rotated in direction, shown by arrow, in Fig. 8, engages inclined wing P¹ on side holding pawl P², and lifts P² out of engagement with tooth P³, on arm "P" of picker lid, and permits lid to close—assisted by proper springs not shown. Fig. 8 shows picker lid closed with holding pawl P², in position to engage tooth P³, upon rotation around shaft R².

S is an intermittent driven gear connected to the ground wheel "T", through the drive shaft X¹ and bevel gears "V" and "W" and clutch X². Said gear "S" is driven by gear "H" to which the power is applied as aforesaid.

X is a lever to clutch X² for connecting and disconnecting said clutch with drive shaft X¹ which drives the harvester forward on the ground intermittently when clutch is closed. Y is a roller carrying finger attached to each of the links F, F, F, F, adapted to make periodical contact with the flange stop, "Z" (see Fig. 6).

C¹ is a cam attached to driving gear "H" adapted to periodically operate the tripping lever "R" (see Fig. 5).

D¹ shown in perspective detail in Fig. 6, is one of the two side walls of the harvester which are attached at S¹ to the channel iron frame E¹. Each wall carries a bearing B, and cam grooves G², adapted to receive the set of 3 guide cam rollers A¹, B¹ and B², on axle Z² carrying each of the four pickers L¹, L², L³, L⁴. The rollers are shown more in detail on Fig. 7.

F¹ is the ascending portion of each cam. F² is the descending portion of each cam. A¹, B¹, B² are guide cam rollers attached to each picker designed to follow in cam shaped grooves G² in the side walls D¹, shown in Fig. 6, and are attached rigidly to the pickers L¹, L², L³, L⁴.

The power is applied to pulley Z¹ integral with shaft X¹ at one end. Driving gear H is integral with same shaft at opposite end, and revolves continuously in direction of arrow. This gear H has 8 teeth on approximately ½ of its circumference. Driven intermittent gear G has 8 teeth on approximately each ¼ of its circumference. Consequently when gear H is in mesh with gear G, and gear H makes ½ of one revolution, gear G makes ¼ of one revolution.

*Description of picker.*

Picker L¹ (which is identically the same as pickers L², L³ or L⁴, and detailed in Fig. 12) is a hollow box shaped receptacle whose side and bottom are composed of equidistantly spaced forks or tines secured at the back of picker to a cross piece and side brackets. Said cross piece and brackets also carry a rotatable release shaft R² around which the picker lid is free to rotate when not held open by the holding latch P², which is centrally located on a bracket integral with the cross piece aforementioned.

The side brackets at their upper end are adapted to be carried integrally with a shaft on which is the segmental gear N and arms with rollers A¹, B¹ and B², more plainly shown detailed in Fig. 7.

I will now endeavor to explain the meaning of the words "movably" and "fixedly" which are used to describe the two conditions of the gears H, G and S. When the cogs (or teeth) in gears H and G are in mesh, gear G is in condition to be revolved by the revolution of gear H.

When gear G is so revolved, the four pickers move around on the harvester. They are therefore (when in that condition) considered "movably" connected to the harvester. When the cogs (or teeth) in said gears H and G are out of mesh, and one of the convex arches in the circumference of gear H enters the concave hollow portion of gear G, then gear G is locked from being revolved by gear H and the pickers from being moved on the harvester, even though gear H continues to revolve. The pickers are therefore considered (when in this condition) to be "fixedly" fastened to the harvester.

One quarter of the circumference of ground wheel T is just equal in length to the full length of the forked floor portion of the pickers that come in contact with the ground. When therefore the ground wheel T rolls the harvester forward, the picker which is on the ground at that moment, and "fixedly" connected to the harvester, moves forward with it. The consequence is that when the harvester moves forward a distance equal to one quarter of the circumference of the ground wheel T, it carries the picker L¹ as shown in Fig. 1 (which is then on the ground and fixedly connected) forward with it, its full length.

Hence each picker in turn is (by its changed condition from being movably and fixedly connected) carried alternately forward and backward while on the ground, its full length. Then another picker reaches the ground.

*Operation of the gears.*

At the instant these two movements are fully completed and another picker reaches the ground, the two gears H and G unmesh. The smooth convex portion of the circumference of H enters into the smooth concave portion of the circumference of G and prevents G from rotating. Simultaneously with the accomplishment of this event, gear H meshes with gear S (which is a duplicate of gear G). Then one half of one revolution of H causes S to make one quarter of one revolution. Gear S being connected to ground wheel T, by the shaft X¹, bevel gears V and W and clutch X² cause ground wheel T to make one quarter of one revolution in direction of arrow forward on the ground. In other words, gear H continuously revolves. In every revolution that it makes, it alternately rotates and locks gear G and gear S.

When, for instance, gear G is rotating, then gear S is locked and the harvester rests unmoved on the ground. But as gear G is still rotating, the four pickers continue to move around 90° of their circle on the harvester. Hence the term "movably connected to the harvester." The movement of the picker (which at this moment is on the ground in the vines, with its lid closed down, with the berries entrapped within it) is, first: to recede horizontally its full length out of the vines; second: to rise from the ground and follow the cam a space upward.

Gear G has now performed its special function and is again locked by gear H. Gear S now rotates.

When gear S is rotating (and gear G is locked) the harvester moves forward on the ground by the rotation of ground wheel T. Gear G being locked, the pickers are thereby "fixedly" connected to the harvester. Consequently they move forward with it.

The position of the picker which is at this moment on the ground is as shown in Fig. 1. Its motion is to move forward into the vines its full length, then to drop or close the lid.

Gear S has now performed its function and is locked, and gear G again rotates.

These gear movements are further explained as follows:

Gear H, to which the power is applied, revolves continuously in the direction of the arrow in Fig. 1. It has all its teeth on approximately one half of its circumference. It has one quarter as many teeth as either gears G or S, which it drives. Therefore when gear H makes one half of one revolution (when in mesh with gear G) it revolves gear G one quarter of one revolution. Gear S is a duplicate of gear G, therefore when gear H is in mesh with gear S and gear H makes one half of one revolution it revolves gear S one quarter of one revolution.

Ground wheel T is connected to gear S by the shaft X¹, mitre gears V and W and clutch X². Therefore when gear S makes one quarter of one revolution as before stated, ground wheel T makes one quarter of one revolution. It will be seen that while driving gear H is in continuous rotary motion, alternating and intermittent rotation of driven gears G and S is required. Therefore, gear S is held stationary while gear G is rotating ¼ of one revolution in same direction of rotation as ground wheel T, to bring another picker onto the ground; then drive gear H meshes with driven gear S and gear G is held stationary while gear S moves the harvester forward on the ground a distance equal to the length of the picker forks then resting on the ground—or equivalent to the rotation—in a reverse direction—of the gear G, therefore the subsequent picker enters the vines at the point where its predecessor left off, or at the terminus of its forward stroke.

*The operation of the pickers and vehicle in harvesting.*

Suppose that picker L¹ is on the ground as shown in Fig. 1, ready to move forward into the vines (except that the lid (or upper jaw) which is shown closed, has been raised and locked in the raised position, as shown in pickers L² and L³). The gear G is fixedly locked by the convex smooth portion of the circumference of gear H. The gear H is in mesh with gear S ready to rotate it.

When therefore gear H makes one half of one revolution, gear S and ground wheel T (which is connected to S by mitre gears) will each make one quarter of one revolution, thereby moving the harvester vehicle forward, carrying with it picker L¹ (which is fixedly attached to the harvester by the locked condition of H and G) its full length on the ground under the berries into the vines with its lid open.

At this moment gear H unlocks from gear S and meshes with gear G. At the same instant the cam C¹ on gear H engages the trip lever R and by contact with release lever R¹ on picker, unlocks the lid, which falls by gravity and assistance of coil spring (not shown) around M, entrapping the berries in the picker. The harvester and pickers are now in position shown in Fig. 1 with the lid in picker L¹ closed as shown. Gear H then makes one half revolution and rotates gear G, one quarter revolution, which causes picker L¹ to recede its full length on the ground, clear of the vines, stripping the entrapped berries from the vines before it is lifted from the ground by the cam and rollers A¹, B¹, B².

At the end of this recession, finger carrying roller Y on link F of picker L¹ makes contact with flange stop Z, forcing cam follower B¹ into the curved upward portion G² of cam F¹, lifting picker L¹ upward from ground.

When gear G has made its full quarter of one revolution and unmeshes with gear H, picker L² has reached the position on the ground formerly occupied by picker L¹, ready to be advanced into the vines in the same manner as picker L¹ was advanced.

When in due course of operation picker L³ reaches the same position on the ground now occupied by picker L² then picker L¹ will have reached a point near its upmost position on the harvester which picker L³ occupies in Fig. 1. During this last named movement trigger P makes contact with the stop rod Q, opening the lid and locking it open, as elsewhere described.

Simultaneously with the opening of the lid the discharge end of picker L¹ has rotated into juxtaposition with port C of the tube A and discharges its berries by gravity through the port C onto the conveyor belt I, which conveys them to the receptacle K.

As picker L¹ continues its progress around the circle, segment gear N (Figs. 8, 6 and 7) meshes with rack O, causing this picker to rotate around picker supporting axle Z² and bring its guide roller B¹ into proper position in the descending portions of the cam groove F², to be guided by said cam groove back to to its first described position on the ground ready to be again advanced into the vines as shown in Fig. 1.

I claim:

1. In a berry harvester the combination of a frame mounted on wheels; walls supported by said frame, carrying journal bearings and cams; a plurality of berry pickers each having an upper jaw pivoted to a lower jaw; cam followers attached to said pickers; a revolvable cylinder supported in said bearings; said cylinder having open ports; a conveyor within said cylinder; said pickers being pivotally connected to said cylinder; mechanism for imparting revolutionary motion to said cylinder; means for alternately connecting said cylinder fixedly and movably to said harvester; means for propelling said harvester intermittently; means for sliding forward said pickers singly on the ground simultaneously with an intermittent advance of the harvester; means for sliding backward said pickers singly on the ground simultaneously with an intermission; means for propelling said cam followers through said cams; means for ceasing said propulsion intermittently; means for opening, locking, unlocking and closing said upper jaws during said propulsions, intermissions, cessations and recessions.

2. In a berry harvester the combination of a wheeled vehicle supporting walls carrying cams and journal bearings; a revolvable cylinder supported in said bearings and having open ports; said cylinder enclosing a conveyor; berry pickers connected to said cylinder; said pickers having pivoted jaws and cam followers; means for propelling said vehicle; and means for imparting intermittent revolutionary motion to said cylinder.

3. In a berry harvester the combination of, a frame mounted on wheels; walls supported by said frame carrying journal bearings; said bearings supporting a rotatable open ported cylinder; said cylinder enclosing a conveyor; berry pickers connected to said cylinder having pivoted jaws; means for rotating said cylinder; means for advancing and receding said pickers slidingly on the ground, means for opening their jaws when in coincident communication with said ports and conveyor, for emptying their contents onto said conveyor; and means for advancing the harvester intermittently.

4. In a berry harvester the combination of, a wheeled vehicle; a revolvable cylinder supported by said vehicle; said cylinder having arms extending from its outer surface; said cylinder being provided with open ports between said arms; berry pickers pivotally connected with said arms; said pickers having jaws pivotally connected thereto; a conveyor within said cylinder; means for imparting intermittently revolving motion to said cylinder; means for opening said jaws during each of said revolutionary motions when any of said pickers are in coincident communication with said ports and conveyor.

THOMAS F. HALL.